United States Patent [19]

Hansen

[11] 4,407,621
[45] Oct. 4, 1983

[54] SELF-ADJUSTING TURNING ROLL ASSEMBLY

[75] Inventor: Erik Hansen, Gentofte, Denmark

[73] Assignee: ESAB Aktiebolag, Sweden

[21] Appl. No.: 247,536

[22] PCT Filed: Jul. 1, 1980

[86] PCT No.: PCT/SE80/00183

§ 371 Date: Mar. 11, 1981

§ 102(e) Date: Mar. 11, 1981

[87] PCT Pub. No.: WO81/00227

PCT Pub. Date: Feb. 5, 1981

[30] Foreign Application Priority Data

Jul. 12, 1979 [DK] Denmark .............................. 2946/79

[51] Int. Cl.³ ........................ B23Q 1/16; B23K 37/02
[52] U.S. Cl. ................................................... 414/433
[58] Field of Search ................................ 414/431–433

[56] References Cited

U.S. PATENT DOCUMENTS 2,865,690 12/1958 Risse .............................. 414/432 X
3,008,439 11/1961 Stanley .............................. 414/433

Primary Examiner—Robert G. Sheridan
Attorney, Agent, or Firm—Lerner, David, Littenberg, Krumholz & Mentlik

[57] ABSTRACT

A turning roll assembly for the supporting and rotating of a cylindrical object (5) has two pairs of two rollers sets which are axially displaced in relation to each other. A supporting roller of each of the roller sets is rotatably mounted about a horizontal axis (23) in a holder (15,20) which is swivable about an axis (16) situated in a normal plane to the axis of rotation of the object. At least three holders (15,20) are each mounted on its carriage (3). The carriages are freely movable on a foundation in the direction of the axis of the object. The assembly is provided with a mechanism (25,27,29) for each carriage which converts an axial movement of the carriage (3) to a swivel movement of the holder (15,20) about its swivel axis (16). Thereby the foremost end of the roller axis (23) in the direction of movement of carriage swivels backwards in relation to the direction of rotation of the object.

9 Claims, 4 Drawing Figures

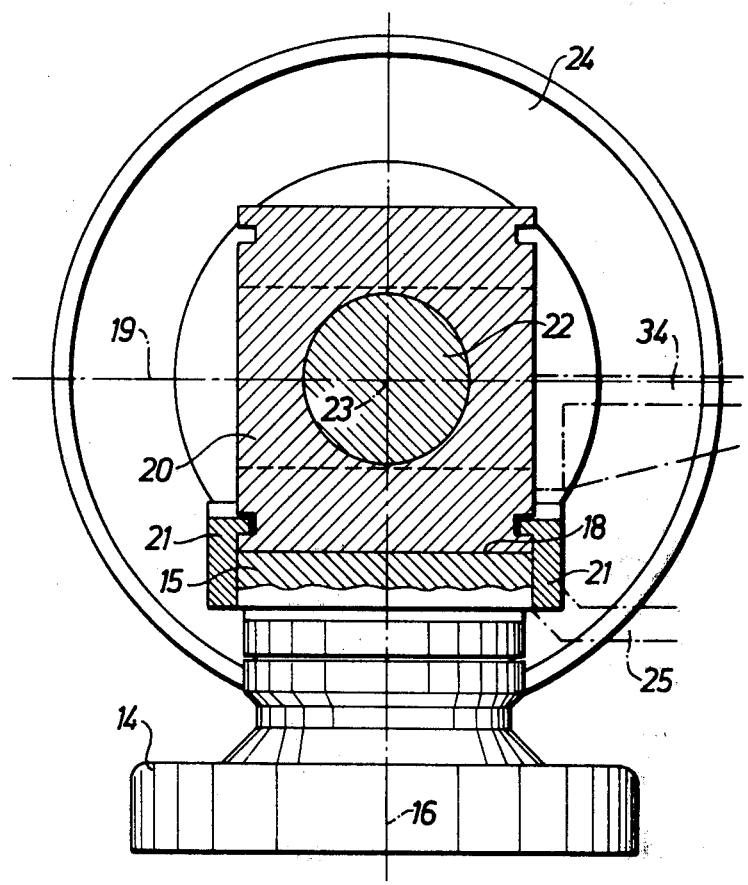

SELF-ADJUSTING TURNING ROLL ASSEMBLY

TECHNICAL FIELD

The invention relates to a self-adjusting turning roll assembly for the supporting of a workpiece intended to rotate about a horizontal axis and having two substantially circular-cylindrical bearing surfaces axially disposed in relation to each other, this device being provided for each of the bearing surfaces of the workpiece with two roller supports, staggered in circumferential direction of the workpiece, with roller sets, each of which consists of one or more supporting rollers embedded with rotability about a horizontal axis in a holder, which is adapted so that it can swivel about an axis situated in a normal plane to the axis of rotation of the workpiece.

Turning roll assemblies of this type are used expecially in the welding together of tubular workpieces to larger container shells and horizontal hollow bodies by circumferential welds. The individual workpieces, which for example are joined together provisionally by tack welding, are placed onto roller sets and are made to rotate about a common axis, past a substantially stationary welding equipment. Since the bearing surfaces may be unmachined and deviate to a varying extent from an accurately circular-cylindrical shape, and furthermore since it is extremely difficult to ensure under all load conditions precise parallelism between all the axes of rotation of the supporting rollers and the axes of the bearing surfaces, appreciable and uncontrolled axial forces between the supporting rollers and the workpiece may possibly arise. As a consequence of these forces the rotating workpiece will tend to travel in the direction of the axis of rotation which renders difficult the performance of the welding operation. The forces may also give rise to overloading of the bearings of the supporting rollers.

Turning roll assemblies of this type may also be used as driving means for rotating cement kilns or the like.

BACKGROUND ART

From the British patent specification No. 1,034,201 a turning roll assembly of the type described above is known, whose roller holder can be swivelled manually about an axis arranged obliquely in respect of the axis of rotation of the rollers, which makes it possible to exercize control over the direction, but not over the magnitude of the axial forces which arise between the rollers and the rotating workpiece, and thus provides a certain possibility of counteracting an undesirable axial travel of the workpiece. With a system of such supports it will presumably be possible by successive adjustment of the individual roller sets prior to the start of a welding operation to achieve a setting where the workpiece, at least during a period, can rotate without axial travel or at the most travel at a sufficiently slow speed to be acceptable for the welding work. However, adjustment can be extremely time-consuming, and altered friction behaviour and deformations in the workpiece, which occur in the course of the welding as a consequence of the heating and of welding stresses, may require after-adjustments in the course of which it may be necessary to interrupt the welding. The problems are further intensified in that the elastic deformations, which are caused by forces between the workpiece and the roller sets, may bring about lack of parallelism between the axes of rotation of individual roller sets leading to new axial forces, which in turn alter the deformations and thus increase the instability.

From the British patent specificaton No. 940,261 a turning roll assembly is known, where swivelling of a turning roll to apply a force to the rotating workpiece to counteract its axial movement is produced automatically in response to this movement. Feelers engaging both ends of the workpiece are connected to one turning roller in such a way that the turning roller is swivelled, when the feeler is axially moved by the workpiece. An automatic compensation of the axial movement of the workpiece is hereby obtained. However, the axial loading of the bearings of the turning rollers is out of control and overloading may occur.

DISCLOSURE OF INVENTION

The above disadvantages are overcome in accordance with the invention, in that all roller holders, with the possible exception of one, are each mounted on its carriage and that each carriage is freely movable on a foundation, independently of the other carriages, in the direction of the axis of rotation, and that the device is provided with a mechanism for each carriage which converts an axial movement of the carriage to a swivel movement of the roller holder mounted on the carriage about the aforementioned swivel axis of the same, which is such that the foremost end of the roller axis in the direction of movement of the carriage swivels backwards in relation to the direction of rotation of the workpiece.

This means that each of the axially movable roller sets during the rotation of the workpiece will automatically search for a position wherein the roller axis is parallel with the axis of rotation of the workpiece and where no axial forces arise between the workpiece and the roller set. This position is called hereinafter the normal position of the roller set. If the actual position of the roller set deviates from the normal position, that is to say, if its rollers are acted upon by an axial force which derives from an inclined position of the roller axis, the carriage with the roller set will commence to move in the direction of the force. Owing to the movement-converting mechanism, the movement of the carriage will cause a gradual straightening out of the roller axis and thereby a correspondingly gradual reduction of the axial force, until the roller set assumes normal position. As the carriage will commence to move as soon as the axial force is capable of overcoming the resistance against the movement of the carriage on the foundation, the free mobility of the carriages and the presence of movement-converting mechanisms will have the result that no axial force can ever arise between each roller set and the workpiece which is greater than the resistance to movement of the carriage. By a suitable supporting of the carriage this resistance can be kept to a fairly low value and this value can be calculated beforehand, so that it is possible to prevent any danger of overloading of the supports of the rollers. Moreover it is possible to dimension the supports, holders and other components solely with a view to their required static bearing capacity without satisfying specific demands regarding rigidity, because the effect of deformations of the components is also compensated by the function of the device described.

It will be readily understood that the axial mobility of the roller holders directly permits an axial travel of the workpiece, and that the device therefore will have to be provided normally with means for the prevention of such travel. However, since the axial forces which the supporting rollers maximally can exercise on the workpiece are limited and can be calculated beforehand, the maximum axial force which is required for retaining the workpiece against undesirable travel is correspondingly limited, and will normally be achievable by a single roller set being mounted in an axially fixed roller holder, which with the help of a movement-converting mechanism is adapted in a similar manner as that connected with the movable carriage, and where an axial movement of the workpiece brings about such a swivel of the roller set that the latter acts upon the workpiece with an axial restoring force directed oppositely to the direction of movement of the same. In this manner the workpiece will always automatically endeavour to assume that axial position where no axial force is effective between the workpiece and the fixed roller holder.

It is a further advantage of the invention that the axial mobility and swivelling ability of the roller holders ensure that all supporting rollers will endeavour to adjust to maximum contact with the workpiece, which makes it certain that all four roller sets are supporting and are substantially in pairs subjected to equal load by the weight of the workpiece. Consequently it will be sufficient to fit a driving motor to a single roller set for moving the workpiece around. This can be unsatisfactory in the prior art because anyone of the roller sets may be relieved of its load to an appreciable degree, if adjustment of the roller axes only brings about mutual cancellation of the axial forces of the individual roller sets, but not of the moments of the forces about a vertical axis.

The invention is based on the understanding that the unsatisfactory situation of the prior art is due to attempts having been made to bring about a balance between unknown and varying forces which cannot be controlled in practice by means of the axially fixed roller supports. The problem has been solved by the invention in an extremely simple manner in that the mounting of each of the roller sets on its own axially freely movable carriage limits the maximum magnitude of the axial forces to such a low value that in reality it can be neglected. The problem is thus reduced to the establishment of a purely kinematic control of the individual roller set, so that it remains in a defined normal position or at the most performs small oscillations about this position. This is achieved by means of the mechanisms converting the movement as described.

In a preferred embodiment, remarkable for the simplicity of its structural design, each movement-converting mechanism comprises a backwards directed steering arm attached to the roller holder which at its rearmost end is controlled in relation to a fulcrum by means of a link guide. The link guide together with the fulcrum enables the roller holders to be steered by purely axially-parallel guides to take up the weight of the workpiece, which facilitates a movement of the roller holders between different axial positions corresponding to workpieces of varying length and/or with varying position of the circumferential bearing surfaces. It is obvious that there must be the possibility for corresponding movement of the fulcrums of the steering arms.

The fulcrums for all steering arms may be fixed in relation to the foundation, but if both the roller holders belonging to the same bearing surface on the workpiece are axially freely movable, a simpler construction will often be achieved, if only the fulcrum for the steering arm of the roller holder which is rearmost in the direction of of rotation of the workpiece is fixed in relation to the foundation, whilst the fulcrum of the other steering arm is fixed in relation to the first mentioned roller holder. The axial mobility of the fulcrum of the foremost roller holder is of no significance for the function of the steering arm, since the steering arm of the rearmost roller holder not only limits the movement of the foremost fulcrum, but also seeks to return this point to a fixed position in relation to the foundation.

It is appropriate for each swivel axis of the roller holders to intersect the axis of rotation of the workpiece or at least to pass closely to this axis, as a greater deviation between the two axes will bring about a lifting of the workpiece during the swivel of the roller set together with undesirable extra stresses on the latter and on the roller holders.

BRIEF DESCRIPTION OF DRAWINGS

FIG. 4 is a section according to line IV—IV in FIG. 3.

Figure 1:
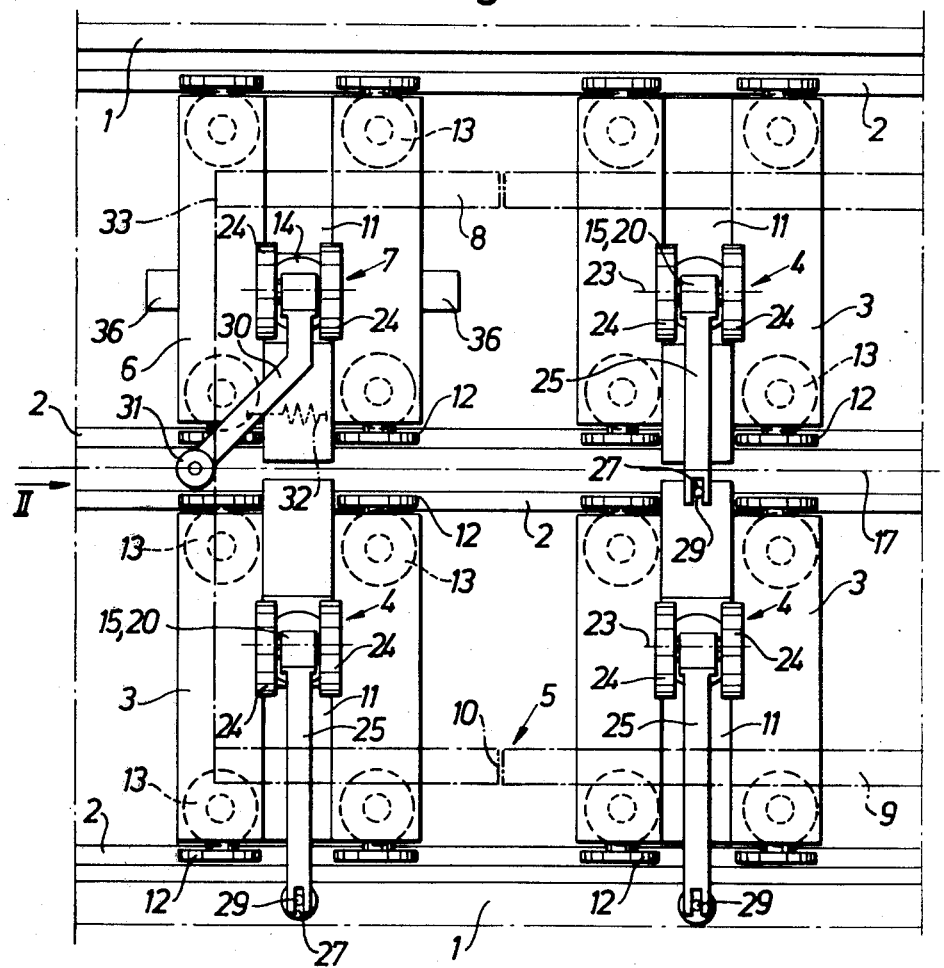
FIG. 1 is a plan view of an embodiment of the device in accordance with the invention.
Figure 2:
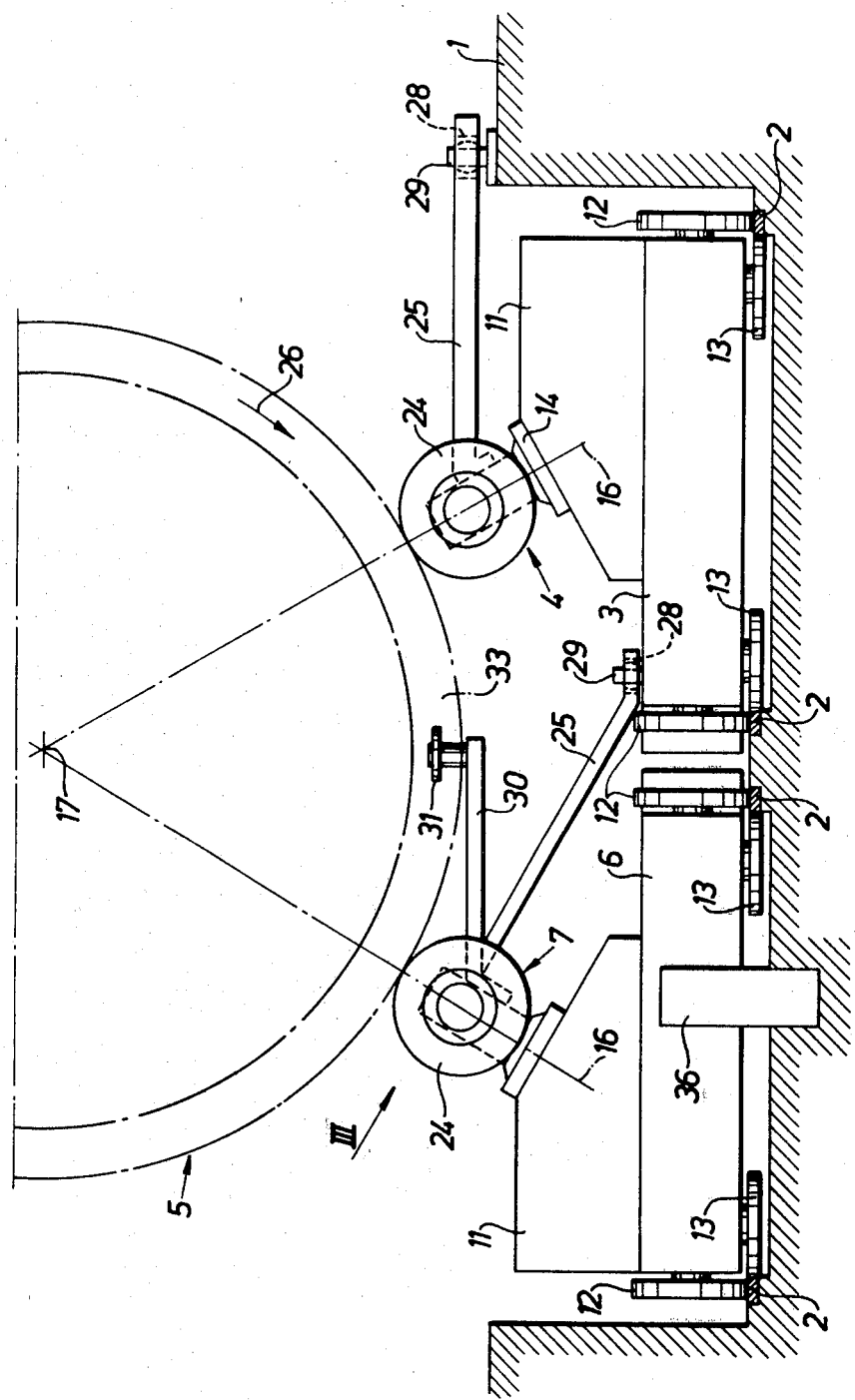
FIG. 2 is a view seen in direction of the arrow II in FIG. 1.

For the sake of clarity certain parts of the device have been left out or are shown only schematically in FIG.1 and 2.

BEST MODE OF CARRYING OUT THE INVENTION

On a foundation 1 for the assembly four mutually parallel supporting and guiding rails 2 are fixed for three carriages 3, displaceable along the rails, each of which carries a supporting unit 4 for a tubular, substantially circular-cylindrical workpiece 5. A fourth carriage 6 is likewise displaceable along the rails 2, but is fixed in certain working situations to the foundation with the help of movable retaining blocks 36. The carriage 6 carries a supporting unit 7 of the same design as the supporting units 4.

In the embodiment shown the workpiece 5 consists of sections 8 and 9, produced for example by rolling of plate material, which have been joined together provisionally by tack welding, and which are to be permanently attached to one another by a circumferential seam weld 10 between their opposite end surfaces.

Each supporting unit 4 is fixed to a slide 11 which in turn is bolted to its associated carriage 3. By means of a guiding device, not shown, each slide 11 can be set transversely to the longitudinal direction of the rails 2 so as to adjust the distance between two supporting units belonging together according to the diameter of the workpiece that is supported. The supporting unit 7 is mounted on the carriage 6 with the help of a corresponding slide 11. Each carriage 3 can move freely in longitudinal direction of the rails 2, as it is supported by four travelling wheels 12. In lateral direction it is fixed by means of four steering wheels 13, the two frontmost of which take up the horizontal components of the forces between the workpiece 5 and the supporting units.

Each supporting unit 4 has a base 14 which is attached to the slide 11 and wherein a saddle 15 can rotate about an axis 16 which is located in a normal plane to the axis of rotation 17. The setting of the slides 11 referred to above is carried out preferably so that each axis 16 should be positioned at least approximately at right angles to the external surface of the workpiece and thus intersects the axis 17 or passes closely by the same. The top of the saddle 15 is designed with a circular-cylindrical contact surface 18 whose axis 19 is at right angles to the axis 16. A bearing block 20 rests on the contact surface 18 and is thus rotatable about the axis 19. Two lock segments 21, which are bolted to the saddle 15, ensure contact of the bearing block against the surface 18 and prevent displacement of the bearing block in direction of the axis 19.

An axle 22, whose centre line 23 is situated perpendicularly to, and intersects, the axes 16 and 19 is fixed in the bearing block 20, and two supporting rollers 24 for the workpiece 5 are supported so that they can rotate freely on the axle 22 on each side of the bearing block 20. The rotation of the bearing block about the axis 19 ensures uniform distribution of the load from the workpiece onto the two rollers 24.

The fixed supporting unit 7, insofar as the components described up to now are concerned, is identical with each of the supporting units 4.

Fixed to the saddle 15, rotatable about the axis 16, of each supporting unit 4 is a steering arm 25 which projects backwards, that is to say in opposite direction to the direction of rotation of the workpiece 5 indicated by an arrow 26 in FIG. 2, and which is situated by and large in a normal plane to the axis of rotation 17 of the workpiece. The rearmost end of each steering arm 25 is controlled in relation to a vertical pin 29 with the help of an oblong recess 27 in the arm and a spherical slide bearing 28.

Two of the said pins 29, which cooperate with the steering arms 25 on two supporting units 4 axially displaced in relation to one another, are fixed to the foundation 1 during the operation of the device, whilst the pin 29 for the steering arm of the third movable supporting unit is fixed to the carriage 3 belonging to the supporting unit 4 placed in the same normal plane to the axis of rotation 17 of the workpiece.

An arm 30 is fixed to the saddle 15, rotatable about the axis 16 of the axially stationary supporting unit 7. Similarly to the arms 25, the arm 30 projects backwards in opposite direction to the direction of rotation 26 of the workpiece. On its rearmost end the arm 30 carries a feeler roller 31 which is connected to the carriage 6 via a tension spring 32 which retains the roller in contact with the end face 33 of the section 8 which is situated at right angles to the axis 17. If the workpiece 5, and with it the end face 33, move in the direction of the axis 17, the arm 30 will turn about the axis 16 of the unit 7. As the arm is fixed to the rotatable saddle 15 of the unit, the supporting rollers 24 will participate in the rotation of the arm. The alteration of the direction of the roller axis 23 in relation to the axis 17 caused thereby, produces an axially directed force between the rollers and the workpiece 5, which acts against travel of the workpiece and hence serves to fix the same axially in relation to the welding equipment, not shown, which produces the welding seam 10.

It will be understood that the mechanism described for the fixing of the axial position of the workpiece could be replaced by any other suitable servo-mechanism, which, for example, could be optically controlled from the end face of the workpiece or from a circle marked out beforehand on the external surface of the workpiece.

As the three other supporting units 4 are mounted on the mutually independently and freely movable carriages 3, the supporting rollers 24 of these units cannot absorb axial forces which exceed the resistance to the movement of the carriages. In case the workpiece commences to travel axially and, because of friction, seeks to take along the rollers, for example, towards the right in FIG. 1, the saddle 15 of the roller unit 4 will swivel in clockwise direction, owing to the guidance of the steering arm 25 on the pin 29. Thereby an axial force, growing with the swivel movement and directed towards the left, arises on the supporting rollers which seek to return the carriage and the roller unit to normal position, where the axial force is eliminated or in any case is smaller than the resistance to movement of the carriage. The same occurs in case one or more of the roller axes at the start of the rotation of the workpiece are not parallel with the axis 17.

Figure 3:
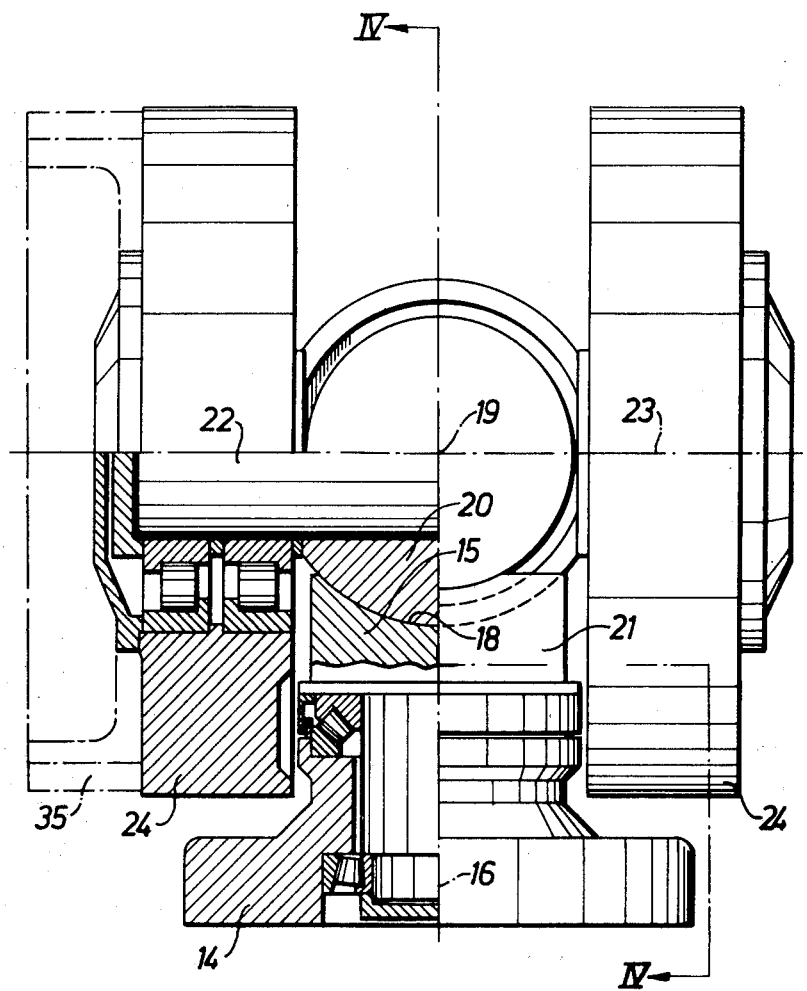
FIG. 3 is a view of a single roller holder on a larger scale seen in direction of the arrow III in FIG. 2 and partly in section.

In FIGS. 3 and 4 it is illustrated in a very schematic manner how one or more of the supporting rollers 24 can be driven by a motor, not shown in the drawing, and thereby serve to produce rotation of the workpiece. It will be appropriate to mount the driving motor or each driving motor, which advantageously can be an infinitely variable gear motor, on a bracket 34 fixed directly to the bearing block 20 of the driven supporting roller and move the supporting roller via a gear rim 35 which is attached to the side facing outwards of the roller 24.

The axial fixing of the rotating workpiece can also be ensured by means other than those described above, for example with the help of a firmly mounted roller, which is in contact with the one end of the workpiece, and a hydraulically loaded roller which is in contact with the opposite end of the workpiece. In this case all the supporting units will be freely movable in axial direction. If it is considered desirable, for example in view of the length or of the weight of the workpiece, to support the same by more than four supporting units, the further units should be adjustable in vertical direction, e.g. with the help of a system similar to a hydraulic jack with associated pressure accumulator to assure a substantially uniform distribution of the load over the supporting rollers of all the units. It will be immediately obvious that instead of the supporting units described, each with two supporting rollers carried on projecting axle ends, units with a single supporting roller carried in a fork, which is adapted so that it can pivot about an axis located in a normal plane to the axis of rotation of the workpiece, may be used.

I claim:

1. Apparatus for supporting a workpiece including first and second axially disposed cylindrical bearing surfaces rotatable about a common longitudinal axis, said apparatus comprising a first pair and a second pair of rotatable support roller means for supporting said workpiece for rotation therewith, said first pair of said rotatable support roller means being disposed on either side of said longitudinal axis of said first bearing surface, and said second pair of said rotatable support roller means being disposed on either side of said longitudinal axis of said second bearing surface, one of said rotatable support roller means being pivotably mounted on a stationary member, carrage members for supporting each remaining one of said rotatable support roller means, said carriage members being mounted with respect to first and second paths parallel to said longitudinal axis and being independently and freely movable along one of said first and second paths in response to axial movements of said workpiece during rotation thereof in a predetermined direction, first adjustment means associated with each of said carriage members and responsive to axial movement of said carriage members for causing said remaining ones of said rotatable support roller means supported by said carriage members to rotate about an axis substantially perpendicular to said longitudinal axis and thereby counteract said axial movement of said workpiece, and second adjustment means responsive to axial movement of said workpiece for causing said one rotatable support roller means to rotate about an axis substantially perpendicular to said longitudinal axis and thereby to counteract said axial movementof said workpiece.

2. The apparatus according to claim 1 wherein said stationary member comprises a further carriage member mounted to one of said first and second paths, said further carriage member being provided with fixing means for preventing said further carriage member from moving along one of said first and second paths.

3. The apparatus according to claim 1 wherein said first adjustment means is responsive to movement of each of said movable carriage members, each of said first adjustment means comprising steering arm means and each of said steering arm means including a steering arm including a first end and a second end, said first end of each of said steering arms being fixed to said rotatable support roller means supported by said carriage members, and said second end of each of said steering arms being rotatable about a fulcrum, said second end of each of said steering arms facing in a direction opposed to said predetermined direction of rotation of said workpiece, said second adjustment means comprising a lever arm including a first end and a second end, said first end of the lever arm being fixed to said one support roller means, and said second end of the lever arm being provided with a feeler means resiliently engaged with a surface of the workpiece perpendicular to said axis, said lever arm facing in a direction opposed to said predetermined direction of rotation of said workpiece.

4. The apparatus of claim 3 wherein said fulcrum associated with one of each of said movable carriage members comprises a stationary fulcrum.

5. The apparatus of claim 3 wherein said first adjustment means associated with a pair of said movable carriage members supporting one of said first and second pair of said rotatable support roller means comprises a stationary fulcrum for the second end of the steering arm of the rearmost of said pair of rotatable support roller means measured in said predetermined direction of rotation of said workpiece and a fulcrum fixed in relation to said movable carriage member supporting said rearmost rotatable support roller means for the second end of the steering arm of the foremost one of said pair of rotatable support roller means measured in said predetermined direction of rotation of said workpiece.

6. Apparatus for supporting a workpiece including first and second axially disposed cylindrical bearing surfaces rotatable about a common longitudinal axis, said apparatus comprising a first pair and a second pair of rotatable support roller means for supporting said workpiece for rotation therewith, said first pair of said rotatable support roller means being disposed on either side of said longitudinal axis of said first bearing surface, and said second pair of said rotatable support roller means being disposed on either side of said longitudinal axis of said second bearing surface, carriage members for supporting each of said rotatable support roller means, said carriage members being mounted with respect to first and second paths parallel to said longitudinal axis and being independently and freely movable along one of said first and second paths in response to axial movement of said workpiece during rotation thereof in a predetermined direction, adjustment means responsive to axial movement of said carriage members for causing said rotatable support roller means to rotate about an axis substantially perpendicular to said longitudinal axis to counteract said axial movement of said workpiece.

7. The apparatus of claim 6 wherein said adjustment means is responsive to movement of each of said movable carriage members, and each of said adjustment means comprises steering arm means, each of said steering arm means including a steering arm including a first and second end, said first end of each of said steering arms being fixed to said rotatable support roller means, and said second end of each of said steering means being rotatable about a fulcrum, said second end of each of said steering arms facing in a direction opposed to said predetermined direction of rotation of said workpiece.

8. The apparatus of claim 7 wherein said fulcrum associated with each of said movable carriage members takes the form of a stationary fulcrum.

9. The apparatus of claim 7 wherein said adjustment means includes a stationary fulcrum for the second end of the steering arm of the rearmost rotatable support roller means of each of said first and second pair of said rotatable support roller means in said predetermined direction of rotation of said workpiece, and a fulcrum fixed in relation to the movable carriage supporting of each of said rearmost rotatable support roller means for the second end of the steering arm of the foremost of each of said first and second pair of said rotatable support roller means in said predetermined direction of rotation of said workpiece.

* * * * *